(12) United States Patent  
Zhang et al.

(10) Patent No.: US 12,362,495 B2  
(45) Date of Patent: Jul. 15, 2025

(54) ANTENNA, ANTENNA ARRAY AND ELECTRONIC DEVICE

(71) Applicant: BOE TECHNOLOGY GROUP CO., LTD., Beijing (CN)

(72) Inventors: Shiqiao Zhang, Beijing (CN); Jia Fang, Beijing (CN); Feng Qu, Beijing (CN); Yang Zheng, Beijing (CN); Cheng Pan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/024,753

(22) PCT Filed: Jun. 13, 2022

(86) PCT No.: PCT/CN2022/098377  
§ 371 (c)(1),  
(2) Date: Mar. 4, 2023

(87) PCT Pub. No.: WO2023/240396  
PCT Pub. Date: Dec. 21, 2023

(65) Prior Publication Data  
US 2024/0283161 A1   Aug. 22, 2024

(51) Int. Cl.  
*H01Q 15/00*   (2006.01)  
*H01Q 1/38*   (2006.01)

(52) U.S. Cl.  
CPC .......... *H01Q 15/0066* (2013.01); *H01Q 1/38* (2013.01)

(58) Field of Classification Search  
CPC ........ H01Q 15/0066; H01Q 1/38; H01Q 1/36; G02F 1/13; G02F 1/1343; H01P 1/18  
See application file for complete search history.

(56) References Cited

U.S. PATENT DOCUMENTS

| | | | |
|---|---|---|---|
| 11,196,134 B2* | 12/2021 | Kong | ...................... H01P 1/184 |
| 11,837,802 B2* | 12/2023 | Wu | .......................... H01Q 1/38 |
| 2021/0376434 A1 | 12/2021 | Li et al. | |
| 2022/0140800 A1 | 5/2022 | Fang et al. | |

FOREIGN PATENT DOCUMENTS

| | | |
|---|---|---|
| CN | 104409860 A | 3/2015 |
| CN | 107706513 A | 2/2018 |
| CN | 108718001 A | 10/2018 |

(Continued)

*Primary Examiner* — Seung H Lee  
(74) *Attorney, Agent, or Firm* — HOUTTEMAN LAW LLC (57) ABSTRACT

An antenna, an antenna array and an electronic device are provided and belong to the field of communication technology. The antenna includes a first substrate, a second substrate, and a tunable dielectric layer. The first substrate includes a first dielectric substrate and a first electrode layer on a side of the first dielectric substrate close to the tunable dielectric layer; the second substrate includes a second dielectric substrate and a second electrode layer on a side of the second dielectric substrate close to the tunable dielectric layer. The second electrode layer includes a signal electrode, and at least one first branch and at least one second branch electrically connected to the signal electrode; the at least one first branch and the at least one second branch are respectively on two sides of an extending direction of the signal electrode.

17 Claims, 7 Drawing Sheets

(56) References Cited

FOREIGN PATENT DOCUMENTS

| | | | |
|---|---|---|---|
| CN | 110824734 A | 2/2020 | |
| CN | 111009725 A | 4/2020 | |
| CN | 111176036 A | 5/2020 | |
| CN | 111430925 A | 7/2020 | |
| CN | 113346229 A | 9/2021 | |
| WO | WO-2021036921 A1 * | 3/2021 | ........... G02F 1/1313 |

* cited by examiner

ANTENNA, ANTENNA ARRAY AND ELECTRONIC DEVICE

TECHNICAL FIELD

The present disclosure relates to the field of communication technology, and in particular to an antenna, an antenna array and an electronic device.

BACKGROUND

A leaky-wave antenna is a traveling-wave antenna, not only has the characteristics of a broadband, but also has the characteristics that a main lobe beam changes with a frequency, thereby receiving a wide attention. In a modern communication system, particularly for air-borne communication and ship-borne communication, a capability of a scanning of an antenna at a fixed frequency (a fixed-frequency scanning capability of an antenna) is very important, and the scanning for a directional diagram can be realized in the leaky-wave antenna only by changing an operating frequency, and the scanning for the directional diagram cannot be realized at a fixed frequency, so that the application range of the leaky-wave antenna is limited.

SUMMARY

The present disclosure is directed to at least one of the technical problems in the prior art, and provides an antenna, an antenna array and an electronic device.

In a first aspect, an embodiment of the present disclosure provides an antenna, including a first substrate and a second substrate opposite to each other, and a tunable dielectric layer between the first substrate and the second substrate; the first substrate includes a first dielectric substrate and a first electrode layer on a side of the first dielectric substrate close to the tunable dielectric layer; the second substrate includes a second dielectric substrate and a second electrode layer on a side of the second dielectric substrate close to the tunable dielectric layer; the second electrode layer includes a signal electrode, and at least one first branch and at least one second branch electrically connected to the signal electrode; the at least one first branch and the at least one second branch are respectively on two sides of an extending direction of the signal electrode; and a connection node between each first branch and the signal electrode is a first node, and a connection node between each second branch and the signal electrode is a second node; an angle between an extending direction of a connection line connecting at least one first node and any one second node and the extending direction of the signal electrode is not equal to 90°.

In some embodiments, the first electrode layer includes a first reference electrode and a second reference electrode arranged side by side; and an orthographic projection of the signal electrode on the first dielectric substrate is between orthographic projections of the first reference electrode and the second reference electrode on the first dielectric substrate; orthographic projections of the at least one first branch and the first reference electrode on the first dielectric substrate at least partially overlap with each other; orthographic projections of the at least one second branch and the second reference electrode on the first dielectric substrate at least partially overlap with each other.

In some embodiments, the at least one first node and the at least one second node are arranged in a staggered manner in the extending direction of the signal electrode.

In some embodiments, the at least one first branch includes a plurality of first branches and the at least one second branch includes a plurality of second branches; each first branch includes a first end and a second end opposite to each other; and each second branch includes a first end and a second end opposite to each other; the first ends of the plurality of first branches and the first ends of the plurality of second branches are all electrically connected to the signal electrode; the second ends of the plurality of first branches are on a first curve and the second ends of the plurality of second branches are on a second curve; and each of the first curve and the second curve is any one of a cosine curve, a sine curve and a triangular wave curve.

In some embodiments, both the first curve and the second curve are of a same type and are sine curves or cosine curves; the first curve and the second curve have a same period and a same amplitude; and initial phases of the first curve and the second curve differ by 180°±10°.

In some embodiments, a size of a first branch at a peak of the first curve in a direction perpendicular to the extending direction of the signal electrode is not greater than ⅕ of a wavelength corresponding to a highest operating frequency; and a size of a second branch at a peak of the second curve in the direction perpendicular to the extending direction of the signal electrode is not greater than ⅕ of the wavelength corresponding to the highest operating frequency.

In some embodiments, any two adjacent first branches have a first distance therebetween; any two adjacent second branches have a second distance therebetween; and a value of each of the first distance and the second distance is not greater than 1/10 of a wavelength corresponding to a highest operating frequency.

In some embodiments, the at least one first branch includes a plurality of first branches and the at least one second branch includes a plurality of second branches; overlapping areas of orthographic projections of the plurality of first branches and the first electrode layer on the first dielectric substrate are equal to each other; and/or overlapping areas of orthographic projections of the plurality of second branches and the first electrode layer on the first dielectric substrate are equal to each other.

In some embodiments, the overlapping areas of the orthographic projections of the plurality of first branches and the first electrode layer on the first dielectric substrate are equal to each other, and the plurality of first branches have a same size in the direction perpendicular to the extending direction of the signal electrode; and the overlapping areas of the orthographic projections of the plurality of second branches and the first electrode layer on the first dielectric substrate are equal to each other, and the plurality of second branches have a same size in the direction perpendicular to the extending direction of the signal electrode.

In some embodiments, the antenna includes at least one first branch group and at least one second branch group; the at least one first branch group and the at least one second branch group are alternately arranged, and each first branch group includes multiple first branches; and each second branch group includes multiple second branches.

In some embodiments, for each first branch group, overlapping areas of orthographic projections of the multiple first branches and the first electrode layer on the first dielectric substrate are equal to each other; and for each second branch group, overlapping areas of orthographic projections of the multiple second branches and the first electrode layer on the first dielectric substrate are equal to each other.

In some embodiments, the multiple first branches have a same size in the direction perpendicular to the extending direction of the signal electrode; the multiple second branches have a same size in the direction perpendicular to the extending direction of the signal electrode; and the multiple first branches and the multiple second branches have different sizes in the direction perpendicular to the extending direction of the signal electrode.

In some embodiments, the at least one first branch includes a plurality of first branches and the at least one second branch includes a plurality of second branches; each first branch includes a first end and a second end opposite to each other; and each second branch includes a first end and a second end opposite to each other; the first ends of the plurality of first branches and the first ends of the plurality of second branches are both electrically connected to the signal electrode; the second ends of the plurality of first branches and the second ends of the plurality of second branches are on a third curve; and the third curve is any one of a cosine curve, a sine curve and a triangular wave curve.

In some embodiments, in each first branch group, any two adjacent first branches have a third distance therebetween; in each second branch group, any two adjacent second branches have a fourth distance therebetween; and the third distance and the fourth distance have a same value.

In some embodiments, the at least one first branch and the at least one second branch have a same size in the extending direction of the signal electrode.

In some embodiments, the at least one first branch includes a plurality of first branches and the at least one second branch includes a plurality of second branches; thicknesses of at least two first branches are different from each other, and a first branch with a larger thickness has a larger size in the direction perpendicular to the extending direction of the signal electrode than a first branch with a smaller thickness; and/or thicknesses of at least two second branches are different from each other, and a second branch with a larger thickness has a larger size in the direction perpendicular to the extending direction of the signal electrode than a second branch with a smaller thickness.

In some embodiments, the tunable dielectric layer includes a liquid crystal layer.

In a second aspect, an embodiment of the present disclosure provides an antenna array, which includes a plurality of antennas, each of which is the antenna in any one of the above embodiments.

In some embodiments, the antenna array further includes a feed structure, the feed structure includes a first feed port and a plurality of second feed ports electrically connected to the first feed port, and each second feed port is electrically connected to one corresponding antenna.

In a third aspect, an embodiment of the present disclosure provides an electronic device, which includes the antenna array in any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
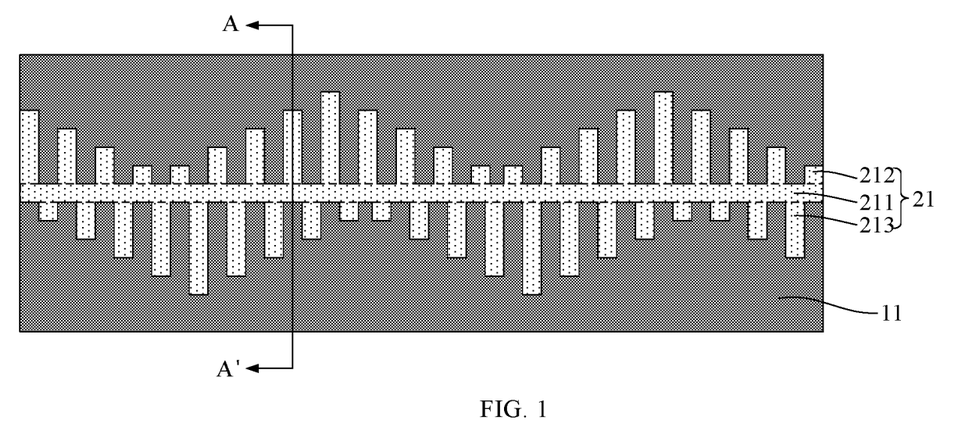
FIG. 1 is a top view of an antenna according to an embodiment of the present disclosure.
Figure 2:
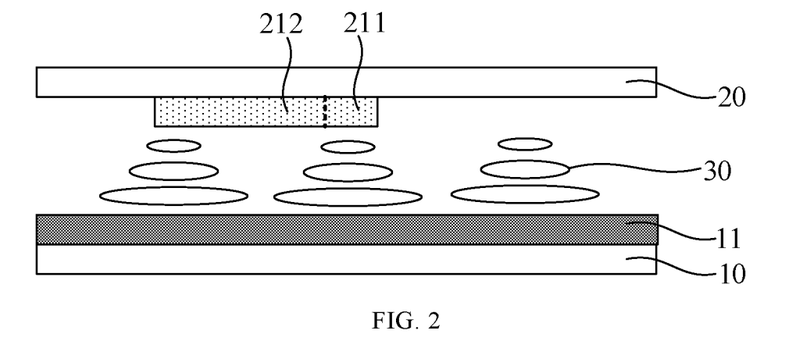
FIG. 2 is a cross-sectional view taken along a line A-A' of FIG. 1.

In a first aspect, FIG. 1 is a top view of an antenna according to an embodiment of the present disclosure. FIG.

Figure 3:
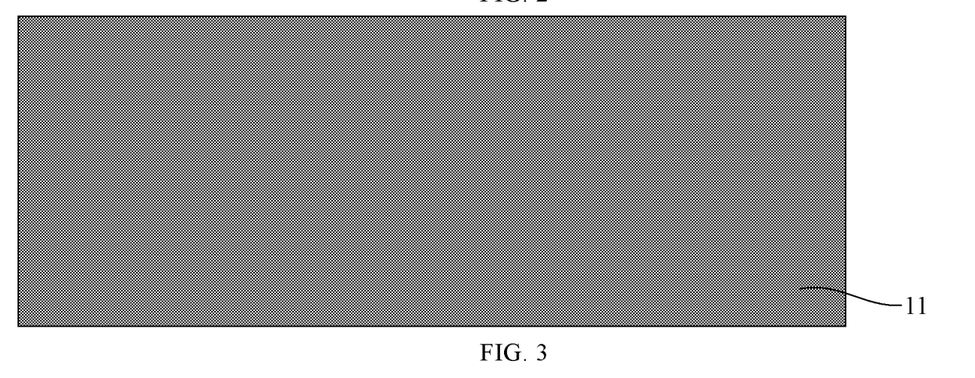
FIG. 3 is a top view of a first conductive layer in the antenna shown in FIG. 1.
Figure 4:
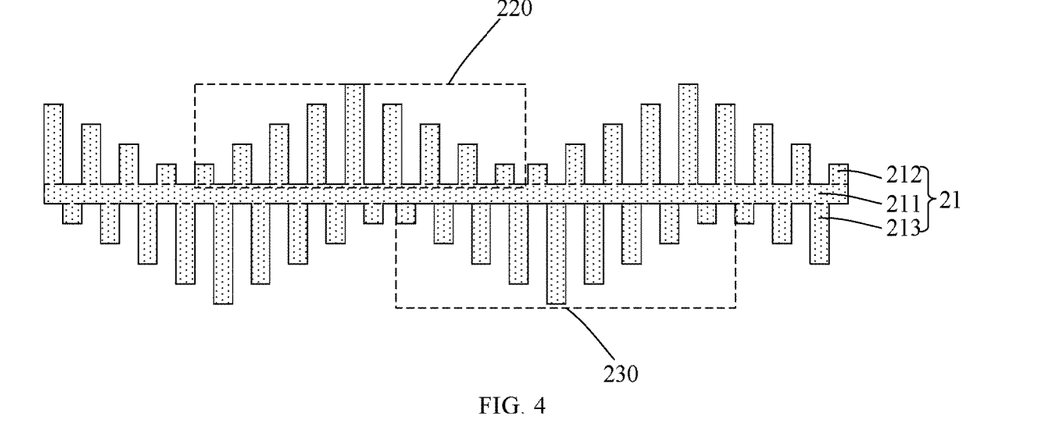
FIG. 4 is a top view of a second conductive layer in the antenna shown in FIG. 1.

2 is a cross-sectional view taken along a line A-A' of FIG. 1. FIG. 3 is a top view of a first conductive layer in the antenna shown in FIG. 1. FIG. 4 is a top view of a second conductive layer in the antenna shown in FIG. 1. As shown in FIGS. 1 to 4, embodiments of the present disclosure provide an antenna, which is specifically a leaky-wave antenna. The antenna includes a first substrate and a second substrate disposed opposite to each other, and a tunable dielectric layer disposed between the first substrate and the second substrate. The first substrate includes a first dielectric substrate 10 and a first electrode layer 11 arranged on a side of the first dielectric substrate 10 close to the tunable dielectric layer. The second substrate includes a second dielectric substrate 20 and a second electrode layer 21 arranged on a side of the second dielectric substrate 20 close to the tunable dielectric layer. The second electrode layer 21 includes a signal electrode 211, and at least one first branch 212 and at least one second branch 213 electrically connected to the signal electrode 211; the at least one first branch 212 and the at least one second branch 213 are respectively disposed on two sides of an extending direction of the signal electrode 211.

In the embodiment of the present disclosure, a connection node between each first branch 212 and the signal electrode 211 is a first node, and a connection node between each second branch 213 and the signal electrode 211 is a second node. An angle between an extending direction of a connection line connecting at least one first node and any one second node and the extending direction of the signal electrode 211 is not equal to 90°. That is to say, each first branch 212 and any one second branch 213 are not opposite to each other in a direction perpendicular to the extending direction of the signal electrode 211 in the antenna, and each first branch 212 and any second branch 213 are disposed alternately in the extending direction of the signal electrode 211. In this case, the at least one first branch 212 and the at least one second branch 213, which are alternately arranged in the extending direction of the signal electrode 211, disturb the electromagnetic wave transmitted in the tunable dielectric layer, thereby realizing the radiation of the electromagnetic wave.

It should be noted that in the embodiment of the present disclosure, as an example, the signal electrode 211 is a strip structure, and therefore, the extending direction of the signal electrode 211 is a length direction of the signal electrode 211. In the embodiment of the present disclosure, the first electrode layer 11 includes, but is not limited to, a ground electrode; and the tunable dielectric layer includes, but is not limited to, a liquid crystal layer 30. In the embodiment of the present disclosure, as an example, the first electrode layer 11 is the ground electrode, and the tunable dielectric layer is the liquid crystal layer 30.

In the embodiment of the present disclosure, an electric field between the first electrode layer 11 and the second electrode layer 21 is changed by changing a voltage applied to the first electrode layer 11, so as to change a dielectric constant of the liquid crystal layer 30. As the dielectric constant of the liquid crystal layer 30 changes, a phase shifting constant β of the leaky-wave antenna changes accordingly. The main beam of the leaky-wave antenna is $\theta=\arccos(\beta/k_0)$, where $k_0$ is a free space wave number (a wave number of an electromagnetic wave in a free space). In this way, a direction of the main beam of the leaky-wave antenna changes, thereby implementing the fixed-frequency scanning characteristics of the leaky-wave antenna.

Figure 5:
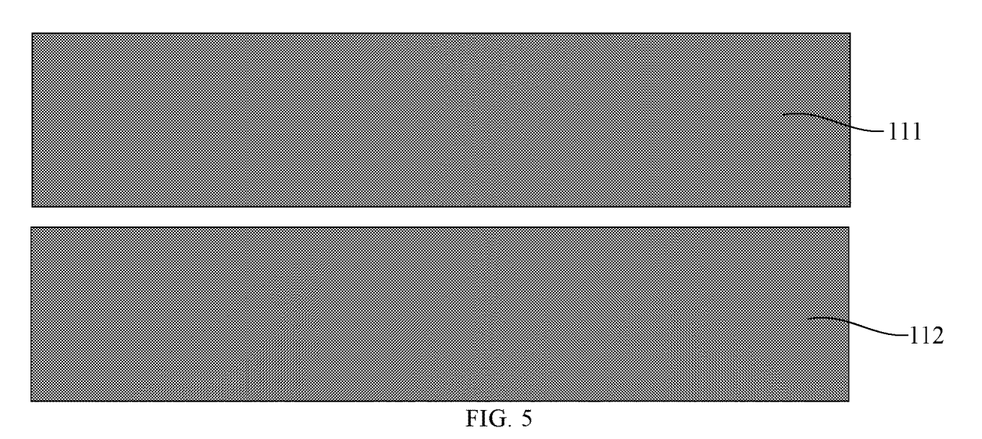
FIG. 5 is a top view of another first conductive layer of an antenna according to an embodiment of the present disclosure.
Figure 6:
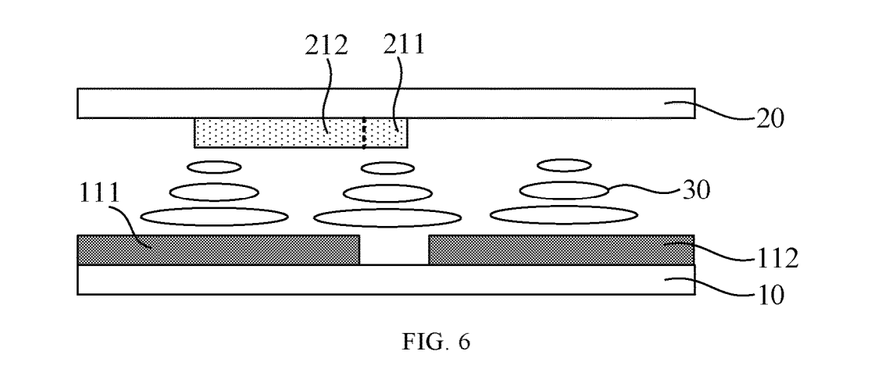
FIG. 6 is a cross-sectional view of an antenna including the first conductive layer shown in FIG. 5.

In some embodiments, the leaky-wave antenna includes, but is not limited to, a microstrip line structure or an opposed (overlay) coplanar CPW (waveguide transmission line) structure. When the leaky-wave antenna adopts a microstrip line structure, the first electrode layer 11 adopts a planar electrode. FIG. 5 is a top view of another first conductive layer of an antenna according to an embodiment of the present disclosure. FIG. 6 is a cross-sectional view of an antenna including the first conductive layer shown in FIG. 5. As shown in FIGS. 5 and 6, when the leaky-wave antenna adopts the opposed coplanar CPW structure, the first electrode layer 11 includes a first reference electrode and a second reference electrode which are arranged side by side. An orthographic projection of the signal electrode 211 on the first dielectric substrate 10 is limited between orthographic projections of the first reference electrode and the second reference electrode on the first dielectric substrate 10. Orthographic projections of the at least one first branch 212 and the first reference electrode on the first dielectric substrate 10 at least partially overlap with each other. Orthographic projections of the at least one second branch 213 and the second reference electrode on the first dielectric substrate 10 at least partially overlap with each other.

It should be noted that when the first electrode layer 11 is the ground electrode, both the first reference electrode and the second reference electrode are grounded. In the embodiments of the present disclosure, the leaky-wave antenna is the opposed coplanar CPW structure for description, as an example.

In some embodiments, each first branch 212 and each second branch 213 may be rectangular, triangular, oval, trapezoidal or the like. In the embodiment of the present disclosure, as an example, each first branch 212 and each second branch 213 are rectangular. That is, the at least one first branch 212 has the same shape, the at least one second branch 213 has the same shape, and the at least one first branch 212 and the at least one second branch 213 have the same shape, but it should be understood that the at least one first branch 212 and the at least one second branch 213 may have different shapes. For example: a part of the at least one first branch 212 is rectangular, and the other part is circular; similarly, the at least one second branch 213 may be disposed in the same way. For another example: the at least one first branch 212 is each rectangular, and the at least one second branch 213 is each rectangular.

When the at least one first branch 212 and the at least one second branch 213 are both rectangular, a size of a first branch 212 in the direction perpendicular to the extending direction of the signal electrode 211 is a length of the first branch 212, and a size of the first branch 212 in the extending direction of the signal electrode 211 is a width of the first branch 212; similarly, a size of a second branch 213 in the direction perpendicular to the extending direction of the signal electrode 211 is a length of the first branch 212, and a size of the second branch 213 in the extending direction of the signal electrode 211 is a width of the second branch 213.

In some embodiments, orthographic projections of at least two first branches 212 and the first reference electrode on the first dielectric substrate 10 have different overlapping areas. For example: widths of the first branches 212 are equal to each other, and lengths of at least two first branches 212 are different from each other; alternatively, lengths of the first branches 212 are equal to each other, and widths of at least two first branches 212 are different from each other. Similarly, orthographic projections of at least two second branches 213 and the second reference electrode on the first dielectric substrate 10 have different overlapping areas. For example: widths of the second branches 213 are equal to each other, and lengths of at least two second branches 213 are different from each other; alternatively, lengths of the second branches 213 are equal to each other, and widths of at least two second branches 213 are different from each other.

In some embodiments, the overlapping area of orthographic projections of each first branch 212 and the first reference electrode on the first dielectric substrate 10 is constant. The overlapping area of orthographic projections of each second branch 213 and the second reference electrode on the first dielectric substrate 10 is constant. For example: the lengths and the widths of the first branches 212 are equal to each other, respectively. The lengths and the widths of the second branches 213 are equal to each other, respectively. Further, the overlapping area of the orthographic projections of each first branch 212 and the first reference electrode on the first dielectric substrate 10 is different from the overlapping area of the orthographic projections of each second branch 213 and the second reference electrode on the first dielectric substrate 10. For example: the width of each first branch 212 is equal to that of each second branch 213, and the length of each first branch 212 is different from that of each second branch 213; the length of each first branch 212 is equal to the length of each second branch 213, and the width of each first branch 212 is different from the width of each second branch 213.

It should be noted that in the drawings of the embodiments of the present disclosure, as an example, the widths of the first branches 212 are equal to each other, and the widths of the second branches 213 are equal to each other.

In some embodiments, the at least one first branch 212 includes a plurality of first branches 212 and the at least one second branch 213 includes a plurality of second branches 213 in the second electrode layer 21. The plurality of first branches 212 and the plurality of second branches 213 are arranged in a staggered manner in the extending direction of the signal electrode 211. For example, the plurality of first branches 212 and the plurality of second branches 213 are alternately arranged in the extending direction of the signal electrode 211. For another example: the plurality of first branches 212 are divided into a plurality of first branch groups 220, and each first branch group 220 includes multiple first branches 212; the plurality of second branches 213 are divided into a plurality of second branch groups 230, and each second branch group 230 includes multiple second branches 213; the plurality of first branch groups 220 and the plurality of second branch groups 230 are alternately arranged.

In some embodiments, thicknesses of the first branches 212 in the second electrode layer 21 may be the same, or thicknesses of at least some first branches 212 may be different from each other. For example: a first branch 212 with a large thickness is provided to have a length of greater than that of the first branch 212 with a small thickness because the first branch 212 with a large length has a greater disturbing strength for the electromagnetic wave than the first branch 212 with a small length with the same thickness. Thus, the first branch 212 with the large length of the first branches 212 may be designed to have a greater thickness, and thus a distance between the first branch 212 with the large length and the first electrode layer 11 (the first reference electrode) can be increased, and the disturbing strength for the electromagnetic wave can be further increased. Similarly, the thicknesses of the second branches 213 may be the same or different. For example: a second branch 213 with a large thickness has a length of greater than that of the second branch 213 with a small thickness.

In some embodiments, the orthographic projection of the first reference electrode in the first electrode layer 11 on the first dielectric substrate 10 only overlaps with the orthographic projection of the at least one first branch 212 on the first dielectric substrate 10; and the orthographic projection of the second reference electrode on the first dielectric substrate 10 only overlaps with the orthographic projection of the at least one second branch 213 on the first dielectric substrate 10. This is because the first electrode layer 11 is made of a metal material, and the first electrode layer 11 is hollowed out except for the positions corresponding to the first branches 212 and the second branches 213, so that a certain metal loss can be reduced, and the radiation can be enhanced. However, it should be understood that when the first electrode layer 11 is hollowed out except for the positions corresponding to the first branches 212 and the second branches 213, compared to the first electrode layer 11 including the first reference electrode and the second reference electrode in the form of strips, an inductive impedance changes, and a frequency band of the antenna changes accordingly. At this time, the arrangement of the first branches 212 and the second branches 213 and the lengths of the first branches 212 and the second branches 213 need to be redesigned to implement the directional scanning in a desired frequency band.

In order to further understand the specific arrangement of the first branches 212 and the second branches 213 in the embodiment of the present disclosure, the following description is made with reference to specific examples. However, it should be understood that only some exemplary arrangements of the first branches 212 and the second branches 213 are given below, and the arrangement of the first branches 212 and the second branches 213 is not limited thereto. It is within the scope of the present disclosure that some first branches 212 and some second branches 213 are arranged in a staggered manner.

In a first example, referring to FIGS. 4 to 6, the first electrode layer 11 includes the first reference electrode and the second reference electrode, and the second electrode layer 21 includes the signal electrode 211, and the plurality of first branches 212 and the plurality of second branches 213 on both sides of the extending direction of the signal electrode 211. The plurality of first branches 212 and the plurality of second branches 213 are alternately arranged in the extending direction of the signal electrode 211. Each first branch 212 has a first end and a second end disposed opposite to each other in the length direction of the first branch 212; and each second branch 213 has a first end and a second end disposed opposite to each other in the length direction of the second branch 213. The first ends of the first branches 212 and the first ends of the second branches 213 are both electrically connected to the signal electrode 211. The second ends of the first branches 212 are located on a first curve and the second ends of the second branches 213 are located on a second curve. The first curve and the second curve are cosine curves.

It should be noted that the second ends of the first branches 212 are located on the first curve, which means that a certain point on each of the second ends of the first branches 212 is located on the first curve, for example: a midpoint of each of the second ends of the first branches 212 is located on the first curve. Similarly, the second ends of the second branch 213 are located on the second curve, which means that a certain point on each of the second ends of the second branches 213 is located on the second curve, for example: a midpoint of each of the second ends of the second branches 213 is located on the second curve.

With continued reference to FIG. 4, the plurality of the first branches 212 and the plurality of the second branches 213 are included, and the widths of the first branches 212 and the second branches 213 are equal to each other. Any two adjacent first branches 212 have a first distance therebetween, and any two adjacent second branches 213 have a second distance therebetween. The first and second distances have the same value.

Further, the second ends of the first branches 212 are distributed on segments of the N periods of the first curve. The first branches 212 are divided into the plurality of first branch groups 220, and each first branch group 220 is arranged corresponding to one period of the first curve, that is, the first branches 212 are divided into N first branch groups 220 arranged continuously. Similarly, the second branches 213 are divided into the plurality of second branch groups 230, and each second branch group 230 is arranged corresponding to one period of the second curve, that is, the second branches 213 are divided into N second branch groups 230 arranged continuously. The number of the first branches 212 in each first branch group 220 may or may not be equal to the number of the second branches 213 in each second branch group 230. In the embodiment of the present disclosure, the number of the first branches 212 in each first branch group 220 is equal to the number of the second branches 213 in each second branch group 230.

When each first branch group 220 includes n first branches 212, each second branch group 230 includes n second branches 213, and n is an even number greater than or equal to 2, for each first branch group 220, the first branches 212 are symmetrically disposed about a straight line perpendicular to the extending direction of the signal electrode 211 and passing through a center of a portion of the signal electrode 211 corresponding to the first branch group 220 as a symmetry axis; for each second branch group 230, the second branches 213 are symmetrically disposed about a straight line perpendicular to the extending direction of the signal electrode 211 and passing through a center of a portion of the signal electrode 211 corresponding to the second branch group 230 as a symmetry axis.

When each first branch group 220 includes n first branches 212, each second branch group 230 includes n second branches 213, and n is an odd number greater than or equal to 3, the n first branches 212 in the first branch group 220 are sequentially arranged, and the n second branches 213 in the second branch group 230 are sequentially arranged. In each first branch group 220, the remaining first branches 212 except for the (n+1)/2-th first branch 212 are symmetrically arranged about a straight line passing through a center of a wide side of the (n+1)/2-th first branch 212 and extending in a length direction of the (n+1)/2-th first branch 212 as a symmetry axis. In each second branch group 230, the remaining second branches 213 except for the (n+1)/2-th second branch 213 are symmetrically arranged about a straight line passing through a center of a wide side of the (n+1)/2-th second branch 213 and extending in a length direction of the (n+1)/2-th second branch 213 as a symmetry axis.

With continued reference to FIG. 4, the length of the first branch 212 with the longest length in the first branch group 220 and the length of the second branch 213 with the longest length in the second branch group 230 do not exceed ⅕ of a wavelength corresponding to the highest operating frequency of the antenna. For example, both lengths are ⅒ of the wavelength corresponding to the highest operating frequency of the antenna. The first distance between any two adjacent first branches 212 and the second distance between any two adjacent second branches 213 do not exceed ⅒ of the wavelength corresponding to the highest operating frequency of the antenna. For example, both the first distance and the second distance are ½₀ of the wavelength corresponding to the highest operating frequency of the antenna. Under the condition, according to the surface plasmon polaritons theory, the dispersion effect can be effectively reduced, and the radiation efficiency of the antenna is improved. With continued reference to FIG. 4, each of the first and last first branches 212 in each first branch group 220 have a thickness that is less than the thickness of each of the remaining first branches 212. For example: the first and last first branches 212 have a thickness of 1.3 μm, and the remaining first branches 212 have a thickness of 2 μm. Similarly, the thicknesses of the second branches 213 in the second branch group 230 may be set in the same manner as in the first branches 212.

Figure 7:
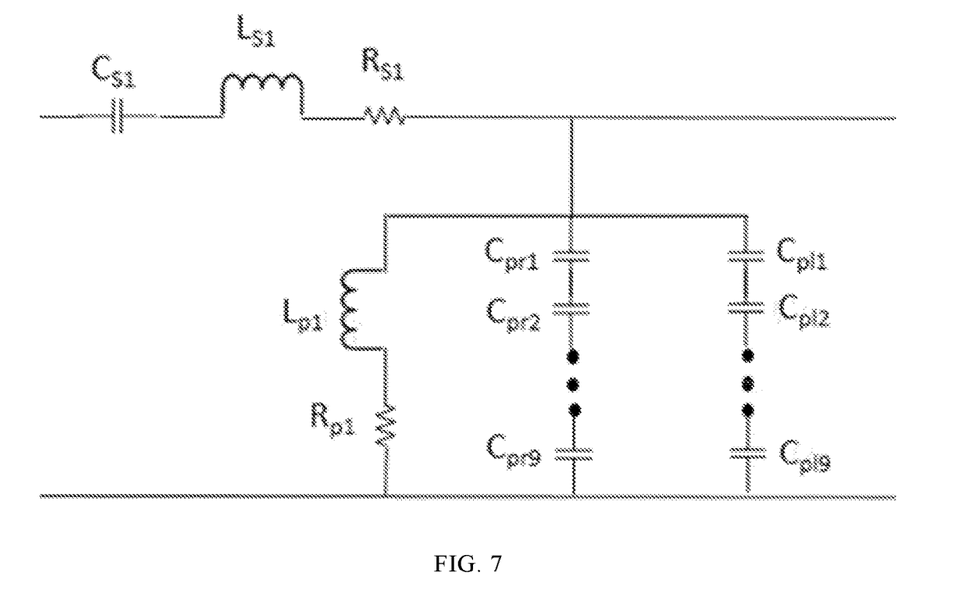
FIG. 7 is an equivalent circuit diagram of 9 first branches and 9 second branches in the antenna shown in FIG. 1.

With continued reference to FIG. 4, each first branch group 220 includes 9 first branches 212, and each second branch group 230 includes 9 second branches 213. FIG. 7 is an equivalent circuit diagram of 9 first branches 212 and 9 second branches 213 in the antenna shown in FIG. 1. As shown in FIG. 7, in parallel capacitors Cpr1 to Cpr9, Cpl1 to Cpl9, a parallel inductor Lp1 and a metal impedance Rp1 formed by the first branches 212 and the second branches 213, the parallel inductor Lp1 and the metal impedance Rp1 are connected in series with each other, which is as a whole connected in parallel with the parallel capacitors Cpr1 to Cpr9 and Cpl1 to Cpl9.

Figure 8:
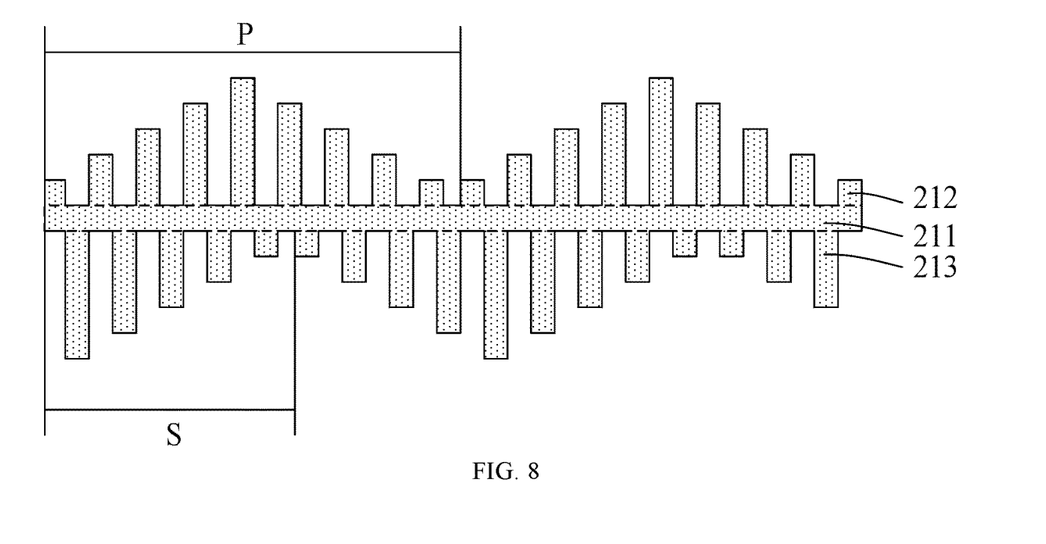
FIG. 8 is a schematic diagram of a part of a second conductive layer according to an embodiment of the present disclosure.

FIG. 8 is a schematic diagram of a part of a second conductive layer according to an embodiment of the present disclosure. As shown in FIG. 8, initial phases of the first and second curves differ by 180°±10°. That is, a distance between a first-first branch 212 in each first branch group 220 and a first-second branch in the second branch group 230 closest to the first branch group 220 is S, a displacement (length/distance) of each period of the first curve is P, and S is about P/2. Each first branch 212 and each second branch 213 have opposite current flow directions, so that the destructive effect of the first branches 212 and the second branches 213 is the weakest with such the arrangement, and thus, the antenna has a stronger (strongest) radiation capability.

Figure 9:
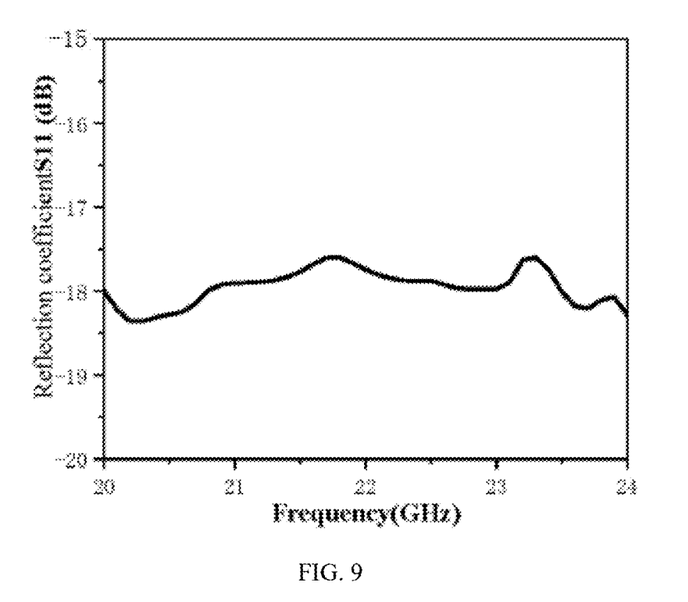
FIG. 9 is a curve of a reflection coefficient S11 of an antenna according to an embodiment of the present disclosure.
Figure 10:
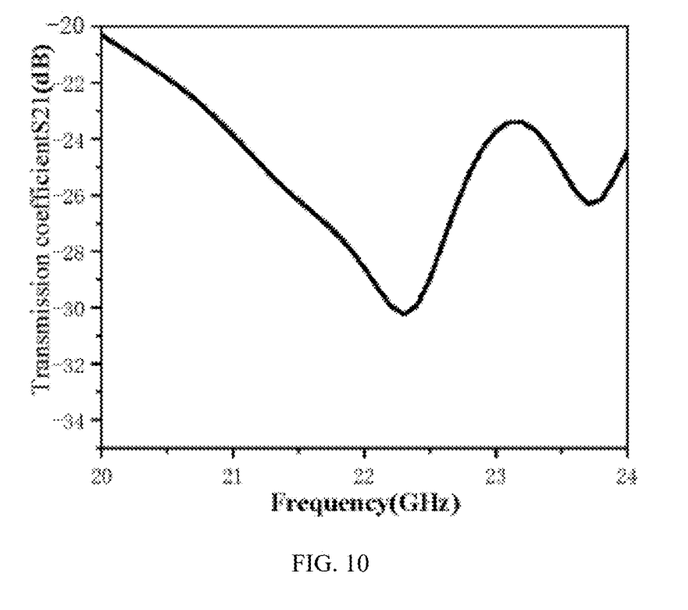
FIG. 10 is a curve of a transmission coefficient S21 of an antenna according to an embodiment of the present disclosure.
Figure 11:
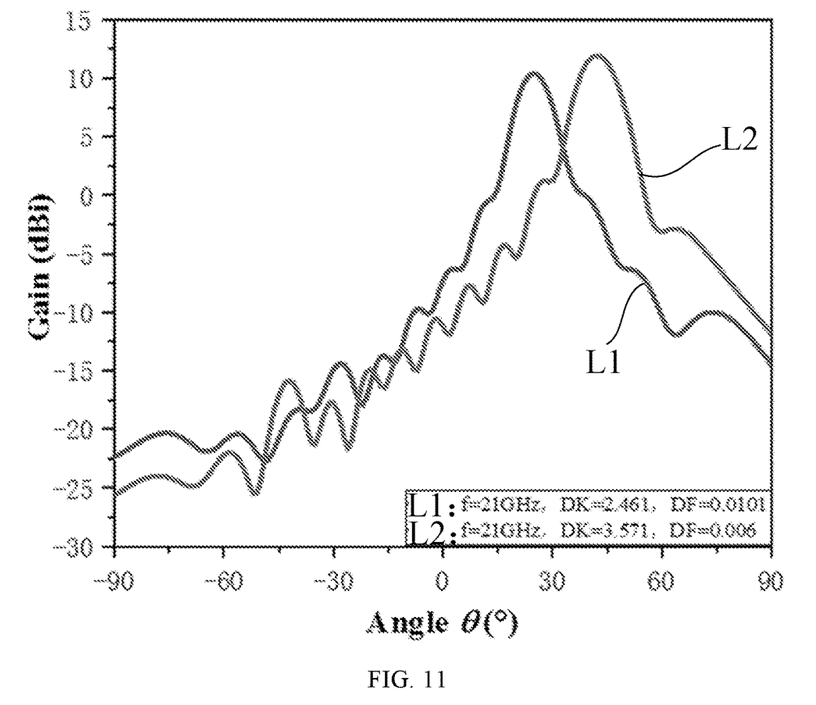
FIG. 11 is a radiation pattern of an antenna with a dielectric constant of a liquid crystal layer at an operating frequency of 21 GHz according to an embodiment of the present disclosure.
Figure 12:
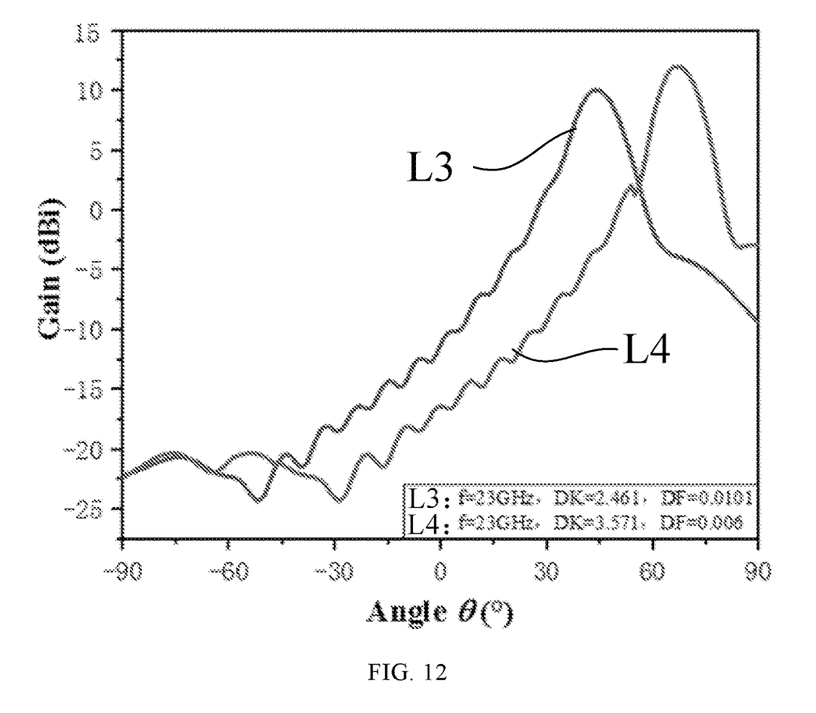
FIG. 12 is a radiation pattern of an antenna with a dielectric constant of a liquid crystal layer at an operating frequency of 23 GHz according to an embodiment of the present disclosure.
Figure 13:
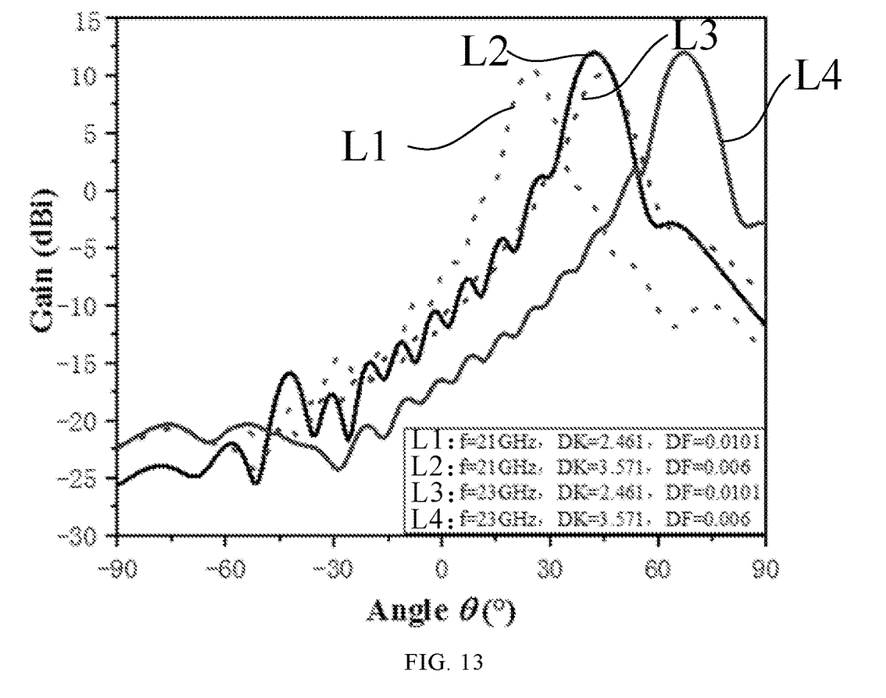
FIG. 13 is a radiation pattern of an antenna with a dielectric constant of a liquid crystal layer at operating frequencies of 21 GHz and 23 GHz according to an embodiment of the present disclosure.

Specifically, when S=0.52P, FIG. 9 is a curve of a reflection coefficient S11 of an antenna according to an embodiment of the present disclosure. FIG. 10 is a curve of a transmission coefficient S21 of an antenna according to an embodiment of the present disclosure. As shown in FIGS. 9 and 10, it can be seen that the antenna has a good radiation effect in the operating frequency band of 20 GHz to 24 GHz. FIG. 11 is a radiation pattern of an antenna with a dielectric constant of a liquid crystal layer 30 at an operating frequency of 21 GHz according to an embodiment of the present disclosure. As shown in FIG. 11, at the operating frequency of 21 GHz, a direction of the main beam of the leaky-wave antenna is changed from $\theta=25°$ (L1) to $\theta=45°$ (L2) with a change in the dielectric constant of the liquid crystals, thereby achieving the scanning of the main beam. FIG. 12 is a radiation pattern of an antenna with a dielectric constant of a liquid crystal layer 30 at an operating frequency of 23 GHz according to an embodiment of the present disclosure. As shown in FIG. 12, at an operating frequency of 23 GHz of the antenna, the direction of the main beam of the leaky-wave antenna is changed from $\theta=44°$ (L3) to $\theta=68°$ (L4) with a change in the dielectric constant of the liquid crystals, thereby achieving the scanning of the main beam. FIG. 13 is a radiation pattern of an antenna with a dielectric constant of a liquid crystal layer 30 at operating frequencies of 21 GHz and 23 GHz according to an embodiment of the present disclosure. As can be seen from FIG. 13, the main beam of the leaky-wave antenna not only has the scanning function that varies with changes in the frequency, but also has the scanning function at a fixed frequency that the direction of the main beam of the antenna varies with changes in the dielectric constant of the liquid crystals at the fixed frequency.

It should be noted that in the first example, as an example, the second end of each first branch 212 and the second end of each second branch 213 are respectively located on two cosine curves for description. That is, the first curve and the second curve are cosine curves. However, in some embodiments, the first curve and the second curve may also be a sine curve or a triangular wave curve, etc., that is, the second end of each first branch 212 and the second end of each second branch 213 are located on two sine curves or two triangular wave curves, respectively, which are not listed here.

Figure 14:
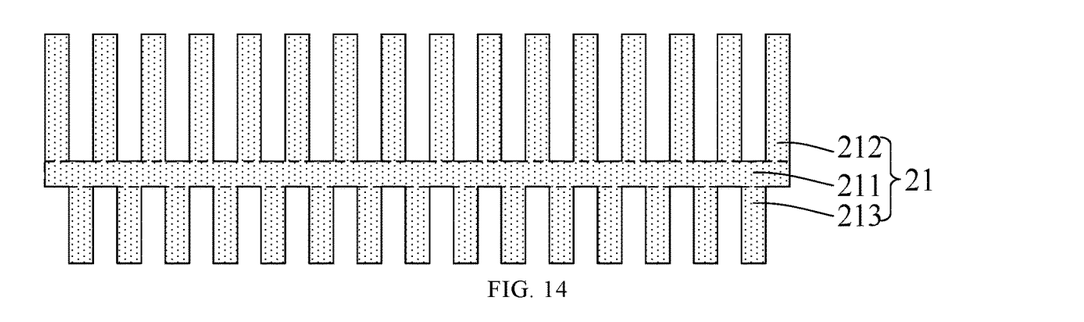
FIG. 14 is a top view of a second electrode layer in an antenna of a second example according to an embodiment of the present disclosure.

In a second example, FIG. 14 is a top view of a second electrode layer 21 in an antenna of a second example according to an embodiment of the present disclosure. As shown in FIG. 14, similarly to the first example, the first branches 212 and the second branches 213 are electrically connected to the signal electrode 211 and are alternately arranged in the extending direction of the signal electrode 211. The difference from the first example lies that in the second example, the lengths of the first branches 212 are equal to each other, the lengths of the second branches 213 are equal to each other, and the lengths of the first branches 212 are not equal to the lengths of the second branches 213. With this arrangement, the antenna can also have better radiation capability, and the manufacturing process is simpler.

Figure 15:
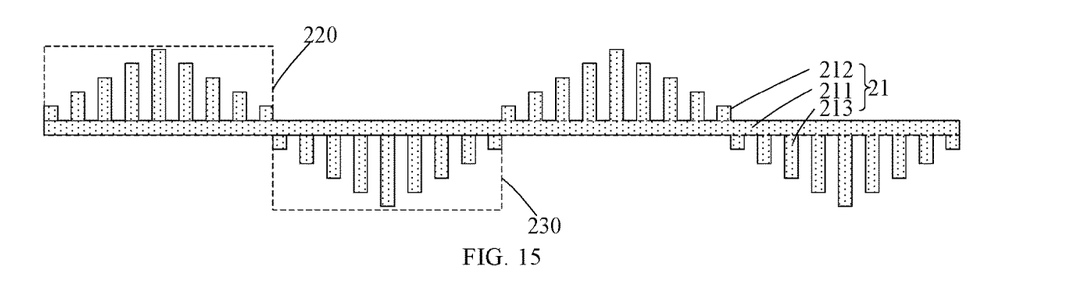
FIG. 15 is a top view of a second electrode layer in an antenna of a third example according to an embodiment of the present disclosure.

In a third example, FIG. 15 is a top view of a second electrode layer 21 in an antenna of a third example according to an embodiment of the present disclosure. As shown in FIG. 15, similarly to the first example, the second ends of the first branches 212 in the first branch group 220 electrically connected to the signal electrode 211 are located on a segment of one period of the cosine curve, and the second ends of the second branches 213 in the second branch group 230 are located on a segment of one period of the cosine curve. The difference from the first example is that in the third example, the first branch groups 220 are not continuously arranged, and the second branch groups 230 are not continuously arranged, but the first branch groups 220 and the second branch groups 230 are alternately arranged in the extending direction of the signal electrode 211. In this case, the antenna can also have a superior radiation capability.

In some embodiments, the second end of each first branch 212 and the second end of each second branch 213 are located on a third curve, which may be a cosine curve, but may also be a sine curve, a triangular wave curve, or the like, which is not listed here. FIG. 15 only illustrates a case where the second end of each first branch 212 and the second end of each second branch 213 are located on a cosine curve.

Figure 16:
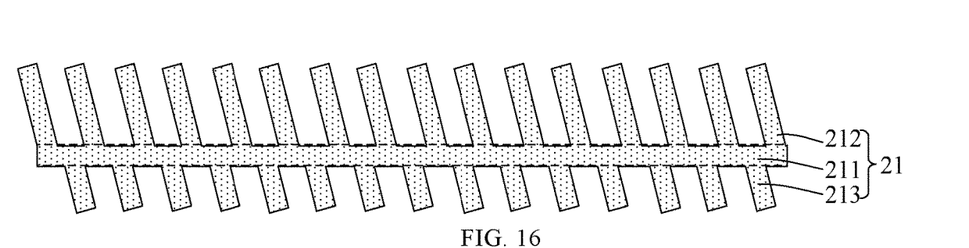
FIG. 16 is a top view of a second electrode layer in an antenna of a fourth example according to an embodiment of the present disclosure.

In a fourth example, FIG. 16 is a top view of a second electrode layer 21 in an antenna of a fourth example according to an embodiment of the present disclosure. As shown in FIG. 16, in this example, an extending direction of each first branch and the extending direction of the signal electrode may be disposed non-perpendicularly, and similarly, an extending direction of each second branch and the extending direction of the signal electrode may be disposed non-perpendicularly. For example: the extending direction of each first branch is the same as that of each second branch, and both the extending directions are not perpendicular to the extending direction of the signal electrode. In this example, the lengths of the first branches and the lengths of the second branches and the staggered arrangement of the first branches and the second branches may be the same as those in any one of the above embodiments, which is not listed here. In FIG. 16, as an example, in the fourth example, the lengths of the first branches and the lengths of the second branches and the staggered arrangement of the first branches and the second branches are the same as those in the second example. No matter which form in the above embodiments is adopted by the antenna in the embodiment of the present disclosure, the first dielectric substrate 10 and the second dielectric substrate 20 may be made of a common PCB insulating substrate such as a teflon glass fiber laminated substrate, a phenol paper laminated substrate, and a phenol glass cloth laminated substrate, or may be made of a hard material with a low microwave loss such as quartz and glass.

In some embodiments, the tunable dielectric layer may be the liquid crystal layer 30 described above. Alternatively, other media with a tunable dielectric constant, such as graphene, may be used. A thickness of the liquid crystal layer 30 has an influence on the scanning time of the beams. Considering that the beam switching time is in an order of ms, the thickness of the liquid crystal layer 30 should not be too large. The thickness of the liquid crystal layer 30 adopted in the embodiment of the present disclosure is about 35 μm. The tunable dielectric constants of the different types of liquid crystals are different. It is necessary to use suitable liquid crystals (such as, LC446 type liquid crystals) according to the desired scanning angle of the beam of the antenna.

In some embodiments, the first electrode layer 11 and the second electrode layer 21 may be made of a low-resistance and low-loss metal such as copper, gold, silver, etc., and may be formed through magnetron sputtering, thermal evaporation, electroplating, etc.

Figure 17:
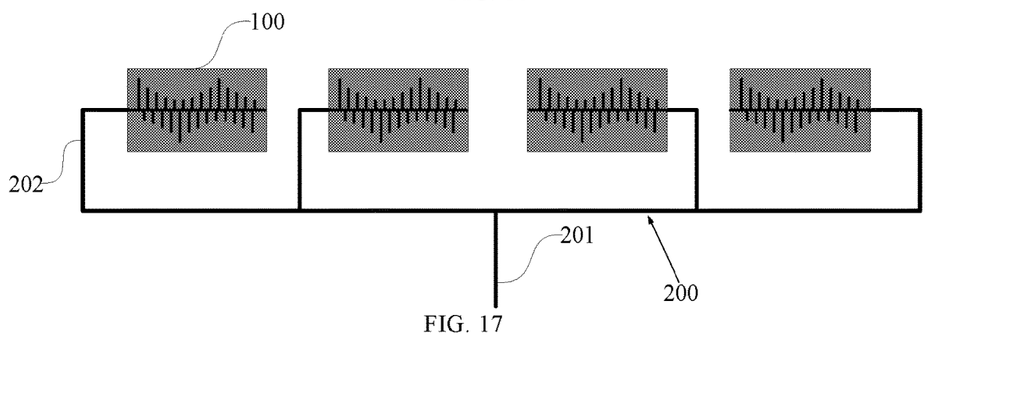
FIG. 17 is a schematic diagram of an antenna array according to an embodiment of the present disclosure.

In a second aspect, FIG. 17 is a schematic diagram of an antenna array of an embodiment of the present disclosure. As shown in FIG. 17, an embodiment of the present disclosure provides an antenna array, including a plurality of the antennas 100.

Alternatively, as shown in FIG. 17, the antenna array may further include a feed structure 200. The feed structure 200 may include a first feed port 201 and a plurality of second feed ports 202 electrically connected to the first feed port 201, each second feed port 202 is electrically connected to one corresponding antenna 100. For example, each second feed port 201 is electrically connected to one corresponding signal electrode. In FIG. 16, the antenna array includes four antennas 100 arranged side by side, and the feed structure 200 employs a one-to-four power divider. In an actual product, different feed structures 200 may be selected according to the number and arrangement of the antennas 100 in the antenna array.

In a third aspect, an embodiment of the present disclosure provides an electronic device which includes the antenna array. The antenna further includes a transceiver unit, a radio frequency transceiver, a signal amplifier, a power amplifier, and a filtering unit. The antenna may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by a transparent antenna in the electronic device and is processed by the filtering unit, the power amplifier, the signal amplifier and the radio frequency transceiver (not shown), the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the electronic device, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the antenna radiates the signals. In the process of receiving signals by the electronic device, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some embodiments, the signal amplifier may include various types of signal amplifiers, such as a low noise amplifier, without limitation.

In some embodiments, the antenna provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising a first substrate and a second substrate opposite to each other, and a tunable dielectric layer between the first substrate and the second substrate; wherein the first substrate comprises a first dielectric substrate and a first electrode layer on a side of the first dielectric substrate close to the tunable dielectric layer; the second substrate comprises a second dielectric substrate and a second electrode layer on a side of the second dielectric substrate close to the tunable dielectric layer; wherein the second electrode layer comprises a signal electrode, and at least one first branch and at least one second branch electrically connected to the signal electrode; the at least one first branch and the at least one second branch are respectively on two sides of an extending direction of the signal electrode;
   a connection node between each first branch and the signal electrode is a first node, and a connection node between each second branch and the signal electrode is a second node; an angle between an extending direction of a connection line connecting at least one first node and any one second node and the extending direction of the signal electrode is not equal to 90°; and
   wherein the at least one first branch comprises a plurality of first branches and the at least one second branch comprises a plurality of second branches; each first branch comprises a first end and a second end opposite to each other; and each second branch comprises a first end and a second end opposite to each other; the first ends of the plurality of first branches and the first ends of the plurality of second branches are all electrically connected to the signal electrode; the second ends of the plurality of first branches are on a first curve and the second ends of the plurality of second branches are on a second curve; and each of the first curve and the second curve is any one of a cosine curve, a sine curve and a triangular wave curve.

2. The antenna of claim 1, wherein the first electrode layer comprises a first reference electrode and a second reference electrode arranged side by side; and an orthographic projection of the signal electrode on the first dielectric substrate is between orthographic projections of the first reference electrode and the second reference electrode on the first dielectric substrate; orthographic projections of the at least one first branch and the first reference electrode on the first dielectric substrate at least partially overlap with each other; and orthographic projections of the at least one second branch and the second reference electrode on the first dielectric substrate at least partially overlap with each other.

3. The antenna of claim 1, wherein the at least one first node and at least one second node are arranged in a staggered manner in the extending direction of the signal electrode.

4. The antenna of claim 3, wherein the at least one first branch comprises a plurality of first branches and the at least one second branch comprises a plurality of second branches; overlapping areas of orthographic projections of the plurality of first branches and the first electrode layer on the first dielectric substrate are equal to each other; and/or overlapping areas of orthographic projections of the plurality of second branches and the first electrode layer on the first dielectric substrate are equal to each other.

5. The antenna of claim 4, wherein the overlapping areas of the orthographic projections of the plurality of first branches and the first electrode layer on the first dielectric substrate are equal to each other, and the plurality of first branches have a same size in the direction perpendicular to the extending direction of the signal electrode; and the overlapping areas of the orthographic projections of the plurality of second branches and the first electrode layer on the first dielectric substrate are equal to each other, and the plurality of second branches have a same size in the direction perpendicular to the extending direction of the signal electrode.

6. The antenna of claim 1, wherein both the first curve and the second curve are of a same type and are sine curves or cosine curves; the first curve and the second curve have a same period and a same amplitude; and a difference between initial phases of the first curve and the second curve is 180°±10°.

7. The antenna of claim 1, wherein a size of a first branch at a peak of the first curve in a direction perpendicular to the extending direction of the signal electrode is not greater than ⅕ of a wavelength corresponding to a highest operating frequency; and a size of a second branch at a peak of the second curve in the direction perpendicular to the extending direction of the signal electrode is not greater than ⅕ of the wavelength corresponding to the highest operating frequency.

8. The antenna of claim 1, wherein any two adjacent first branches have a first distance therebetween; any two adjacent second branches have a second distance therebetween; and a value of each of the first distance and the second distance is not greater than 1/10 of a wavelength corresponding to a highest operating frequency.

9. The antenna of claim 1, wherein the tunable dielectric layer comprises a liquid crystal layer.

10. An antenna, comprising a first substrate and a second substrate opposite to each other, and a tunable dielectric layer between the first substrate and the second substrate; wherein the first substrate comprises a first dielectric substrate and a first electrode layer on a side of the first dielectric substrate close to the tunable dielectric layer; the second substrate comprises a second dielectric substrate and a second electrode layer on a side of the second dielectric substrate close to the tunable dielectric layer; wherein the second electrode layer comprises a signal electrode, and at least one first branch and at least one second branch electrically connected to the signal electrode; the at least one first branch and the at least one second branch are respectively on two sides of an extending direction of the signal electrode;

a connection node between each first branch and the signal electrode is a first node, and a connection node between each second branch and the signal electrode is a second node; an angle between an extending direction of a connection line connecting at least one first node and any one second node and the extending direction of the signal electrode is not equal to 90°;

the antenna comprises at least one first branch group and at least one second branch group; the at least one first branch group and the at least one second branch group are alternately arranged, and each first branch group comprises multiple first branches; and each second branch group comprises multiple second branches;

wherein for each first branch group, overlapping areas of orthographic projections of the multiple first branches and the first electrode layer on the first dielectric substrate are equal to each other;

for each second branch group, overlapping areas of orthographic projections of the multiple second branches and the first electrode layer on the first dielectric substrate are equal to each other; and wherein the at least one first branch comprises a plurality of first branches and the at least one second branch comprises a plurality of second branches; each first branch comprises a first end and a second end opposite to each other; and each second branch comprises a first end and a second end opposite to each other; the first ends of the plurality of first branches and the first ends of the plurality of second branches are both electrically connected to the signal electrode; the second ends of the plurality of first branches and the second ends of the plurality of second branches are on a third curve; and the third curve is any one of a cosine curve, a sine curve and a triangular wave curve.

11. The antenna of claim 10, wherein the multiple first branches have a same size in the direction perpendicular to the extending direction of the signal electrode; the multiple second branches have a same size in the direction perpendicular to the extending direction of the signal electrode; and the multiple first branches and the multiple second branches have different sizes in the direction perpendicular to the extending direction of the signal electrode.

12. The antenna of claim 10, wherein in each first branch group, any two adjacent first branches have a third distance therebetween; in each second branch group, any two adjacent second branches have a fourth distance therebetween; and the third distance and the fourth distance have a same value.

13. The antenna of claim 10, wherein the at least one first branch and the at least one second branch have a same size in the extending direction of the signal electrode.

14. An antenna, comprising a first substrate and a second substrate opposite to each other, and a tunable dielectric layer between the first substrate and the second substrate; wherein the first substrate comprises a first dielectric substrate and a first electrode layer on a side of the first dielectric substrate close to the tunable dielectric layer; the second substrate comprises a second dielectric substrate and a second electrode layer on a side of the second dielectric substrate close to the tunable dielectric layer; wherein the second electrode layer comprises a signal electrode, and at least one first branch and at least one second branch electrically connected to the signal electrode; the at least one first branch and the at least one second branch are respectively on two sides of an extending direction of the signal electrode;

a connection node between each first branch and the signal electrode is a first node, and a connection node between each second branch and the signal electrode is a second node; an angle between an extending direction of a connection line connecting at least one first node and any one second node and the extending direction of the signal electrode is not equal to 90°;

wherein the at least one first branch comprises a plurality of first branches and the at least one second branch comprises a plurality of second branches;

thicknesses of at least two first branches of the plurality of first branches are different from each other, and a first branch with a larger thickness of the at least two first branches has a larger size in the direction perpendicular to the extending direction of the signal electrode than a first branch with a smaller thickness of the at least two first branches; and/or thicknesses of at least two second branches of the plurality of second branches are different from each other, and a second branch with a larger thickness of the at least two second branches has a larger size in the direction perpendicular to the extending direction of the signal electrode than a second branch with a smaller thickness of the at least two second branches.

15. An antenna array, comprising a plurality of antennas, each of which is the antenna of claim 1.

16. The antenna array of claim 15, further comprising a feed structure, wherein the feed structure comprises a first feed port and a plurality of second feed ports electrically connected to the first feed port, and each second feed port is electrically connected to one corresponding antenna.

17. An electronic device, comprising the antenna array of claim 15.

\* \* \* \* \*